United States Patent Office 3,647,916
Patented Mar. 7, 1972

3,647,916
ISOPARAFFIN-OLEFIN ALKYLATION WITH CRYSTALLINE ZEOLITE CATALYSTS AT LOW ISOPARAFFIN TO OLEFIN RATIOS
Philip D. Caesar, Princeton, and Werner O. Haag, Trenton, N.J., and John J. Wise, Philadelphia, Pa., assignors to Mobil Oil Corporation
No Drawing. Filed Oct. 8, 1969, Ser. No. 864,862
Int. Cl. C07c *3/52;* B01j *11/02*
U.S. Cl. 260—683.43                                10 Claims

ABSTRACT OF THE DISCLOSURE

A continuous process for alkylation of a branched chain hydrocarbon with an olefin in the presence of a crystalline aluminosilicate zeolite catalyst employing a reaction mixture in which the molar ratio of isoparaffin to olefin is extremely low compared to conventional alkylation, i.e. generally below 3 to 1 followed by regeneration and reuse of the catalyst so employed.

BACKGROUND OF THE INVENTION

Field of invention

The field of art to which this invention pertains is the alkylation of isoparaffins with olefins to yield normally liquid hydrocarbons of enhanced octane number useful in gasoline blending.

Description of the prior art

Alkylation of isoparaffins and olefins into a high octane fuel component has conventionally made use of sulfuric acid and hydrogen fluoride catalysts. In such processes, high ratios of isoparaffin to olefin are required to obtain requisite yields of the desired alkylate and to minimize formation of undesired olefin polymer.

Thus, in alkylation of isobutane with butenes ratios of 8–10/1 are generally required. In isobutane alkylation with mixed (50/50) $C_4$ and $C_3$ olefins ratios of about 12/1 are needed with the above catalysts. The expense of separating the excess isobutane from the reaction product is, as well known to those skilled in the art, a major cost factor in conventional alkylation. Accordingly, a process utilizing a low isoparaffin to olefin ratio in the reaction mixture would result in a more economical alkylation operation. The use of such low ratio of reactants has, however, not been capable of effective realization with the above catalysts since the octane number of the products so obtained is very much lower than those resulting with use of the above specified conventional molar ratios of isoparaffin to olefin.

It has also been previously known from U.S. 3,251,902 to employ crystalline zeolite catalysts for isoparaffin-olefin alkylation in which the molar ratio of isoparaffin to olefin is generally greater than 3 to 1.

SUMMARY OF THE INVENTION

It has been found in accordance with the present invention that an efficient, economical continuous process for alkylation of isoparaffins with olefins in the presence of an ion-exchanged crystalline aluminosilicate catalyst having selective activity for effecting such alkylation can be achieved by alkylating with low isoparaffin to olefin molar ratios, i.e. below 3 to 1 and regenerating of the catalyst to remove olefin polymerization products therefrom.

DETAILED DESCRIPTION OF THE INVENTION

In detail, the present invention deals with a continuous process for alkylating branched chain hydrocarbons by effecting reaction of a branched chain paraffin containing from 4 to 20 carbon atoms with an olefin containing from 2 to 12 carbon atoms employing a reaction mixture wherein the molar ratio of the isoparaffin to olefin is below 3/1 in contact with a catalyst comprising a crystalline aluminosilicate having selective activity for effecting alkylation with such olefin, such crystalline aluminosilicate having uniform pore openings of at least 7 angstrom units, for a period of time until the catalyst exhibits decreased activity attributable to the accumulation in the pores thereof of polymerization products of the olefins, thereafter removing such accumulation to accomplish regeneration of the catalyst and reusing the resulting regenerated catalyst in such process.

The catalyst utilized in the process described herein is prepared from synthetic or naturally occurring aluminosilicates having active sites within their ordered internal structures which provide selective activity for effecting alklation with the described olefin alkylating agents. The active sites are produced by exchanging the aluminosilicate with metal cations and/or hydrogen cations to partially or substantially completely replace the exchangeable metal cations, such as those of the alkali metals. Preferably the aluminosilicate is exchanged so that a substantial proportion of the original alkali metal is replaced with hydrogen and/or rare earth cations. In one embodiment the process of this invention is directed to the production of branched chain paraffins such as 2,3-dimethyl butane by reacting isobutane with ethylene in liquid or mixed vapor-liquid phases in the presence of the above described crystalline zeolite catalyst.

Alkylation of isoparaffins employing an isoparaffin/olefin molar ratio below 3/1 is effectively carried out in accordance with the process of this invention utilizing an aluminosilicate catalyst which has been ion exchanged with metal cations or hydrogen cations or both so as to have acid sites within its ordered internal structure. It has been found under the conditions of the present process that such catalyst has a selective activity for effecting alkylation of branched chain paraffins with olefins at low temperatures in both liquid and mixed liquid-vapor phases. The selective activity of the catalyst is dependent upon the concentrations of acid sites. It is believed that these acid sites catalyze alkylation by causing the isoparaffin reactant to form an alkyl radical at each of the acid sites. The alkyl radical so produced is then believed to react with the olefin and the acid site is regenerated in the process by the hydrogen displaced from the alkylated isoparaffin. The concentration of acid sites may be increased or decreased to provide the desired degree of selective activity necessary for a particular alkylation reaction. Control of the activity of the catalyst may be effected by exchange of the aluminosilicate with metal, hydrogen or hydrogen precursor cations, such as ammonium, or a combination of such cations so that substantially all or only a portion of the exchangeable cations usually present within the ordered internal structure of the aluminosilicate are replaced with the exchanging cations. In general the greater the extent of cation replacement, the larger the concentration of acid sites.

The degree of selective activity of the crystalline aluminosilicate catalyst employed in the process of this invention may be controlled by physically reducing the number of available acid sites within an exchanged aluminosilicate. Such may be accomplished by steaming the exchanged aluminosilicate catalyst under controlled conditions before it is used in the process of the invention. Steaming is believed to reduce the number of acid sites which may be contacted by the reactants. As will be realized, polymerization reactions reduce the amount of olefin reactant available for the alkylation process and also form accumulations of polymerized high molecular weight products which form within the pore structure of the aluminosilicate adversely affecting its activity in accomplishing the desired alkylation.

The olefin alkylating agents employed in the present process are those containing from 2 to 12 and preferably 2 to 6 carbon atoms. Thus suitable olefin reactants include ethylene, propylene, butylene, amylene, dodecylene and the like. The particular olefin alkylating agent employed should be chemically stable under the conditions of the reaction so that it will not immediately polymerize with itself or other reactants.

It has been found in carrying out the process of this invention during initial contact of reactants and catalyst that polymerization and other undesired side reactions of the olefin alkylating agent can be reduced by regulating the order of introducing the reactants into the reaction vessel. Thus the isoparaffin reactant to be alkylated is desirably charged first and allowed to substantially saturate the crystalline zeolite catalyst prior to introduction into the reactor of the olefin alkylating agent.

The isoparaffin compounds alkylated in accordance with the process of this invention may contain 4 to 20 and preferably 4 to 6 carbon atoms. As will be realized, since there are several isomers of the higher molecular weight paraffins, this process may be employed to alkylate a wide variety of physically different compounds.

The crystalline aluminosilicate catalyst employed in the process described herein may be derived from natural or synthetic crystalline aluminosilicates which have a defined pore size in excess of 7 angstroms and generally in the approximate range of 7 to 15 angstroms. These aluminosilicates are considered to have a three-dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. The aluminosilicates in their hydrated form may be represented by the formula:

$$M_{2/n}O:Al_2O_3:wSiO_2:yH_2O$$

wherein M is a cation which balances the electrovalence of the tetrahedra, $n$ represents the valence of the cations, $w$ the moles of $SiO_2$ and $y$ the moles of $H_2O$. The cation initially may be one or more of several metal cations depending upon whether the aluminosilicate is synthesized or occurs naturally. Typical cations include sodium, potassium, lithium, calcium etc. Although the proportions of inorganic oxides in the silicates and their arrangement may vary, giving rise to distinct properties in the aluminosilicate, the two main characteristics of these materials is the presence in their molar structure of at least 0.5 equivalent of an ion of positive valence per gram atom of aluminum and an ability to undergo dehydration without substantially effecting the $SiO_4$ and $AlO_4$ framework.

Typical of the crystalline aluminosilicates utilized in the process of the present invention are the synthetic faujasites such as zeolite X and zeolite Y. Zeolite X may be represented in terms of mole ratios of oxides as follows:

$$1.0\pm0.2M_{2/n}O:Al_2O_3:2.5\pm0.5SiO_2:yH_2O$$

wherein M is a cation having a valence of not more than 3, $n$ represents the valence of M, and $y$ is a value up to 8, depending on the identity of M and the degree of hydration of the crystal. The sodium form may be represented in terms of mole ratios of oxides as follows:

$$0.9Na_2O:Al_2O_3:2.5SiO_2:6.1H_2O$$

Zeolite X is commercially available in both the sodium and the calcium forms. Zeolite Y may be represented in terms of mole ratios of oxides as follows:

$$0.9\pm0.2Na_2O:Al_2O_3:WSiO_2:XH_2O$$

wherein W is a value greater than 3 up to about 5 and X may be a value up to about 9.

The selectivity of zeolite Y for larger molecules is appreciably the same as zeolite X because its pore size lies in the range of about 9 angstroms to about 10 angstroms.

Representative of the naturally occurring aluminosilicates that may be used in the present alkylation process is a naturally occurring zeolite known as mordenite. This zeolite is an ordered crystalline structure having a ratio of silicon atoms to aluminum atoms of about 5 to 1. In its natural state, it usually appears as the sodium salt which is represented by the following formula:

$$Na_8(Al_2)_8(SiO_2)_{40}24H_2O$$

Other aluminosilicates, as will be appreciated, can be employed as catalysts for the alkylation process of this invention. It is necessary that the ordered internal structure of the aluminosilicate employed have defined pore sizes of sufficient diameters to allow entry of the isoparaffin and olefin reactants and the formation of the desired alkylation products. In addition the aluminosilicate should desirably have an ordered internal structure capable of chemisorbing or anionically bonding additional metals or hydrogen ions within its pore structure so that its catalytic activity may be altered for a particular alkylation reaction. Typical of the naturally occurring aluminosilicates which may be employed are faujasite, heulandite, clinoptiloite, mordenite and dachiardite. These crystalline aluminosilicates have the ability to adsorb hydrocarbons containing more than three carbon atoms within their internal structure.

A particularly preferred catalyst for use in the present process is that prepared from synthetic sodium faujasite such as zeolite X or zeolite Y by ion exchange of the sodium with a fluid medium containing cations of at least one of the rare earth metals. Any suitable medium which will ionize the cations without affecting the crystalline structure of the zeolite may be used. After such treatment the exchanged product is water washed, dried and dehydrated. The pore size of the resulting rare earth exchanged aluminosilicate is generally about 9 to 10 angstroms in diameter.

In carrying out the above ion exchange, the rare earth cations can be provided from the salt of a single metal or preferably a mixture of metals such as rare earth chlorides or didymium chlorides. Such mixtures are usually intoduced as a rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight, and other rare earth oxides 0.8% by weight. Didymium chloride is also a mixture of rare earth chlorides, but having a low cerium content. It consists of the following rare earths determined as oxides; lanthanum 45–46% by weight; cerium, 1–2% by weight; praseodymium, 9–10% by weight, neodymium, 32–33% by weight; samarium, 5–6% by weight; gadolinium 3–4% by weight; yttrium, 0.4% by weight; other rare earths 1–2% by weight. It is to be understood that other mixtures of rare earths are equally applicable in the instant invention.

Likewise, zeolite Y may be activated by the same ion exchange techniques. Also, mordenite may be activated to serve as a catalyst in the process of this invention by replacement of the initial sodium ions with hydrogen ions. To accomplish such replacement generally a mineral acid such as HCl is used as the source of hydrogen ions. The mordenite prior to such acid treatment is generally reduced to a fine powder passing through a 200 mesh sieve.

Cations of polyvalent metals other than the rare earths having a valence of 3 or more may be employed to replace the exchangeable cations from the aluminosilicates and to provide effective catalysts for the present alkylation process. Exemplary of such metals are titanium, zirconium, aluminum, vanadium, chromium, manganese, iron, cobalt and the like. The chemical properties of the metals, i.e. its atomic radius, degree of ionization and the like will determine its suitability for exchange with the particular aluminosilicate. In addition certain divalent metal cations such as calcium, magnesium, and barium may be used with ammonium compounds such as ammonium chloride, to provide the necessary acid sites within the aluminosilicate catalyst by conventional exchange techniques; the portion of the acid sites being formed by heating the aluminosilicate to drive off ammonia.

The activity of the aluminosilicate catalyst is also affected by the availability of the active sites within its ordered internal structure. As will be realized, the pore size of the catalyst determines whether a compound of specific molecular configuration could contact the active sites by passing through its ordered internal structure. Accordingly, catalysts having larger pore sizes may promote alkylation for a greater range of different branched chain hydrocarbons. Also the rate of deactivation of the catalyst is affected by the pore size. It would appear that larger pore sizes allow the reactants to pass more freely through the ordered internal structure, thereby facilitating shorter contact times which prevent product degradation. In addition the crystalline aluminosilicates with larger pore sizes accommodate greater accumulation of polymerized residue before becoming blocked and deactivated and thus may be utilized a longer time on stream than the aluminosilicate of smaller pore size. Generally the aluminosilicates used to prepare the catalysts employed in the present process preferably have a pore size of from about 7 angstroms to about 13 angstroms in diameter.

Since the selective activity of the aluminosilicate catalyst employed in the present process is governed by the concentration of acid sites within its ordered internal structure as well as by the availability of these sites, it is desirable to determine the activity level for a particular ion exchanged aluminosilicate catalyst. For such purpose, a test has been found to be a convenient means for measuring the activity of these catalysts.

In conducting the test, n-hexane is fed to a reactor which contains a catalyst to be evaluated. The flow rate of the n-hexane, catalyst sample size and temperature in the reactor are preselected to obtain conversion levels which preferably fall in the range of 5 to 50 weight percent. The hexane is usually charged by vaporization from a temperature-regulated bath with an inert carrier gas such as helium. Under normal conditions the vapor feed will consist of about 20% n-hexane, 80% helium.

The hexane is fed to the reactor until the catalyst to hexane ratio (volume basis) equals about 50. At this time a sample of the reaction products is taken and analyzed by gas chromatography.

The conversion of n-hexane determined from the chromatograph is converted to a reaction rate constant by the assumption of a first order or psuedo-first order reaction. The value obtained is normalized by dividing by the reaction rate constant for conventional silica-alumina catalyst containing about 10 weight percent alumina and having a Cat-A activity of 46 as described in National Petroleum News 36, page P.R.-537 (Aug. 2, 1944). Such catalyst is hereinafter designated as 46AI silica-alumina catalyst. This value is then corrected to 1000° F. by use of an Arrhenius plot if the evaluation occurred at some other temperature. Results are therefore reported as relative rate constants at 1000° F. and the term α has been assigned to this value. Thus by definition the 46AI silica-alumina catalyst has an activity constant of one α.

The range of operating conditions for this test are as follows:

Catalyst volume in reactor, cc. _____ 0.1–10
n-Hexane flow rate, cc./hr. _____ 0.2–30
Liquid hourly space velocity _____ 0.2–40
Catalyst to hexane ratio _____ 2.0–200
Temperature in reactor, ° F. _____ 500–1000

However, normally test conditions remain fixed for the temperature as shown below:

Catalyst volume in reactor, cc. _____ 1.5
n-Hexane flow rate, cc./hr. _____ 0.66
Liquid hourly space velocity _____ 0.44
Catalyst to hexane ratio _____ [1] 46

[1] For 5 minutes on stream.

The product sample is usually taken after 5 minutes on stream and passed into the chromatograph for analysis. Frequently another product sample is taken at a longer on stream time, say 30 minutes, and comparison of these two values gives a picture of the catalysts' decline in activity with time or its aging rate. Times shorter than 5 minutes can be used but these sometimes give a false percent conversion value because an equilibrium state of desorption of products and unconverted hexane charge has not been reached.

By using the n-hexane test and assigning the 46AI silica-alumina catalyst an activity constant (α) of one, it has been found that the catalysts of this invention have acivity constants (α) of at least five and may be as high as several thousand. It will be appreciated that these high levels of activity can be regulated by the base exchange techniques used to prepare the catalyst as well as by physical treatment of the prepared catalyst such as calcination, steaming or incorporation into a less active support material.

The aluminosilicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous absorbents, carriers and supports of the type heretofore employed in catalytic operations may feasibly be used in combination with the crystalline aluminosilicate. Such materials may be catalytically inert or may posses an intrinsic catalytic activity or an activity attributable to close association or reaction with the crystalline aluminosilicate. Such materials include by way of examples, dried inorganic oxide gels and gelatinous precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays.

The aluminosilicate may be intimately composited with a suitable binder, such as inorganic oxide hydrogel or clay, for example, by ball milling the two materials together over an extended period of time, preferably in the presence of water, under conditions to reduce the particle size of the aluminosilicate to a weight mean particle diameter of less than 40 microns and preferably less than 15 microns. Also, the aluminosilicate may be combined with and distributed throughout a gel matrix by dispersing the aluminosilicate in powdered form in an inorganic oxide hydrosol. In accordance with this procedure, the finely divided aluminosilicate may be dispersed in an already prepared hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the aluminosilicate and then dried and calcined.

The inorganic oxide gel employed, as described above as a matrix for the metal aluminosilicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups II–A, III–B, and IV–A of the Periodic Table. Such components include, for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia and silica-magnesia-zirconia. In the foregoing gels, silica is generally present as the major component and the other oxides of metals are present in minor proportion. Thus, the silica content of such gels is generally within the approximate range of 55 to 100 weight percent with the metal oxide content ranging from zero to 45 weight percent. The inorganic oxide hydrogels utilized herein and hydrogels obtained therefrom may be prepared by any method well known in the art, such as, for example, hydrolysis of ethyl ortho-silicate, acidification of an alkali metal silicate and a salt of a metal, the oxide of which it is desired to cogel with silica, etc. The relative proportions of finely divided crystalline aluminosilicate and inorganic oxide gel matrix may vary widely with the crystalline aluminosilicate content ranging from about 2 to about 90 percent by weight and more usually, particularly where the composite is prepared in the form of beads, in the range of about 5 to about 50 percent by weight of the composite. It will be appreciated that base exchange of the metal, ammonium, or hydrogen cations to produce the necessary acid sites within the aluminosilicate may be carried out either before or after the aluminosilicate has been incorporated into the matrix binder material.

The catalyst of aluminosilicate employed in the process of this invention may be used in the form of small fragments of a size best suited for operation under the specific conditions existing. Thus, the catalyst may be in the form of a finely divided powder or may be in the form of pellets of $\frac{1}{16}''$ to $\frac{1}{8}''$ size, for example, obtained upon pelleting the aluminosilicate with a suitable binder such as clay. The zeolite X, described hereinabove, may be obtained on a clay-free basis or in the form of pellets in which clay is present as a binder.

The operating temperature of the described alkylation process may extend from room temperature to 600° F.; preferably the process is conducted at temperatures from 50° to 300° F. The upper operating temperature limits have been found to be determined by the occurrence of undesirable side reactions which reduce the concentration of the reactants. Thus at temperatures of about 500° F. polymerization of olefins greatly increases and causes deactivation of the aluminosilicate catalyst. At lower operating temperatures, i.e. below 50° F., the process produces low yields of the desired alkylated produce or requires extended periods for efficient conversion.

The pressures employed in the present process may extend over a considerable range, i.e. from about atmospheric to about 5000 p.s.i.g. Preferably the pressure is sufficient to maintain at least one of the reactants or reaction products in a liquid phase. Liquid phase operation is believed to promote the length of catalyst activity by preventing the formation of olefinic polymerization and by washing out other by-product high molecular weight compounds from the internal structure of the catalyst caused by the above-mentioned side reactions. In addition liquid phase operation promotes greater catalytic activity by increasing the residence time of the reactants within the catalyst structure. Liquid phase operation is considered particularly desirable for alkylation reactions in which the unsteamed, highly active crystalline aluminosilicate catalysts are employed. Apparently such operation permits these actalysts to exhibit greater selective activity for alkylation without promoting undesirable side reacions such as polymerization of the olefins which may occur during vapor phase operation.

The amount of catalyst used in the present process may be varied over relatively wide limits. In general the amount of catalyst as measured by the liquid hourly space velocity of the isoparaffin may be from about 0.1 to 10. It will be realized that the amount of catalyst selected for a particular reaction will be determined by several variables including the reactants involved as well as the nature of the catalyst and the operating conditions to be used.

In accordance with the process of this invention, the relative molar ratio between the isoparaffin reactant and the olefin alkylating agent is less than 3/1 and generally in the range of 3/1 to 1/1. It has been found by using such comparatively low isoparaffin/olefin ratio that the necessity and expense of separating the excess isoparaffin reaction from the reaction product is eliminated or greatly curtailed. With the use of such low molar ratio of reactants the catalyst is subjected to a faster ageing than with the use of higher molar reactant ratios. However, in accordance with the continuous process of this invention, the catalyst is regenerated to remove the accumulated olefin polymerization products from the surfaces of the catalyst to render the same in a regenerated state and suitable for reuse in the alkylation process.

Accordingly after contact of the isoparaffin/olefin reaction mixture with the described crystalline aluminosilicate catalyst for a period of time until the catalyst exhibits decreased activity due to the accumulation in the pores thereof of olefin polymerization products, the catalyst is regenerated by oxidative combustion of the accumulated surface residue, generally by burning in an oxygen-containing atmosphere at an elevated temperature in the range of about 800 to 1400° F. Usually air is employed as the combustion supporting medium and the catalyst is regenerated after being on stream from about 1 to about 300 minutes. In addition to regeneration by burning the accumulated surface residue, the latter may be removed from the catalyst by contact with suitable solvents such as aromatic hydrocarbons, aromatic nitriles, polar oxygen containing compounds such as alcohols, glycols, ethers, ketones, dioxane, tetrahydrofuran, dimethylformamide, nitrobenzene, carbon disulfide, chloroform and the like. In such regeneration operation, the catalyst to be treated is contacted with the solvent, generally at a temperature in the range of room temperature to 300° F. for a period of time sufficient to effect removal of the residual deposit from the surface of the catalyst. Generally such time of contact between the deactivated catalyst and the solvent will be in the range of 1 to 30 minutes. After the catalyst has been regenerated by effecting removal from its surface of the accumulated polymerized olefin residue, it is in a condition for further reuse, after removing any residual solvent, in effecting the desired isoparaffin/olefin alkylation.

The operation is desirably carried out in a continuous manner utilizing two or more vessels, one of which functions as a reactor and the other of which is used for regeneration of the catalyst. In one embodiment, the catalyst after undergoing regeneration is recycled directly to the reactor with the catalyst being in the form of a continuously moving fluidized or compact bed mass.

The olefin alkylating agent may desirably in some instances be employed in a fluid media which contains a major proportion of an inert diluent. The advantages of such operation will be readily apparent because of the availability and low cost of obtaining such diluent process treatment during hydrocarbon processing. It will further be appreciated that the particular operating conditions employed in the present process will depend on the specific alkylation reaction being effected. Such conditions as temperature, pressure, space velocity and molar ratio of the reactants will have important effects on the overall process. Also the operating conditions for the alkylation reaction in accordance with the continuous process of this invention may be varied so that the same may be conducted in gaseous phase, liquid phase, or mixed liquid-vapor phase, depending upon product distribution, degree of alkylation, as well as the pressures and temperatures at which the alkylation is effected.

The following examples will serve to illustrate the process of the invention without limiting the same:

EXAMPLE 1

The swing reactor assembly for the alkylation of isobutane with ethylene consists of two tubular flow reactors positioned vertically and parallel to each other. The reactors are heated with electrical furnaces. At any given time, alkylation feed is introduced into one of the reactors while the catalyst in the other reactor is regenerated. After some time, the flow of feed is diverted to the second reactor containing regenerated catalyst, and the catalyst in the first reactor is regenerated. Continuous operation is achieved by alternating the on-stream and regeneration cycles.

The catalyst, rare earth exchanged zeolite, is prepared by exchanging sodium X zeolite with a commercial mixture of rare earth chlorides to replace 97 percent of the sodium cations in the zeolite. After drying at 950° F. for two hours, 150 ml. (80 g.) of the catalyst in the form of 14–25 mesh particles are placed in each of the two reactors. Isobutane and ethylene are introduced in the top of the first reactor and passed downflow at the following conditions: temperature 350° F., pressure 1000 p.s.i.g., feed rate of isobutane 43.4 ml. (24.2 g.) per hour, feed rate of ethylene 4.18 liters (measured as gas at atmospheric pressure and 78° F.)=4.9 g. per hour. This represents a molar ratio of isobutane to ethylene of 2.4. The reactor effluent containing the alkylation product is continuously withdrawn at the bottom of the reactor through a back-pressure regulator. Liquid alkylation product and unreacted feed are separated in a gas-liquid separator. At the end of a three hour on-stream period, the feed is diverted to the second reactor, while the catalyst in the first reactor is regenerated by passing air over the catalyst at a rate of three liters per minute for a period of 30 minutes. During this period the catalyst temperature is gradually increased from 750° F. at the beginning to 1025° F. at the end of the regeneration cycle.

EXAMPLE 2

A rare earth hydrogen Y zeolite catalyst is prepared from sodium Y by exchange with rare earth and ammonium chloride and subsequent drying at 225° F. and calcination at 970° F. for two hours in a stream of dry air. 50 g. of this catalyst in the form of 160–200 mesh particles is sealed inside a 300 ml. capacity stirred autoclave provided with inlet and outlet lines. The outlet line for continuous withdrawal of liquids is provided with a porous filter to retain the catalyst in the autoclave.

72 g. of 2-methylbutane is introduced at a temperature of 250° F. and a pressure of 300 p.s.i.g. An alkylation mixture is then introduced at a continuous rate of 72 g. of 2-methylbutane and 25.2 g. of 2-butene per hour, while product is continuously withdrawn. The alkylation mixture corresponds to a mole ratio of isoparaffin to olefin of 2.2. After 4 hours, the hydrocarbon liquid is withdrawn from the reactor, and the catalyst is regenerated in situ by extraction. At the temperature of the reaction, 100 ml. dioxane is added and held in the reactor for a period of 15 minutes. It is then withdrawn as a liquid from which the dioxane solvent is recovered by distillation for reuse. Solvent remaining on the catalyst is stripped with a stream of nitrogen. The regenerated catalyst is then ready for reuse.

EXAMPLE 3

Hydrogen Y zeolite is prepared from sodium Y by repeated exchange with boiling 6 molar ammonium sulfate solution until the sodium content is reduced to below 0.2%. It is then calcined by heating for 10 hours at 1025° F. In the form of 20–25 mesh particles, 60 g. of the catalyst is placed in a tubular reactor of ½ inch inside diameter. At a temperature of 180° F. and a pressure of 350 p.s.i.g., liquid isobutane is pumped into the reactor at an hourly rate of 78 ml. Liquid propylene at an hourly rate of 41 ml. is introduced through three different inlet tubes which are located at the top of the reactor and one-third and two-thirds below the top of the catalyst bed, respectively, the total propylene flow being distributed equally among the three inlet tubes. The total isobutane to proylene molar ratio is 1.5.

The reactor effluent containing appreciable amounts of alkylation product is withdrawn at the bottom of the reactor. After 2 hours on stream, the catalyst is regenerated by steaming. Steam at the rate of 5 liters per minute is passed over the catalyst at a temperature of 250° F. for 15 minutes. The catalyst is then dried in a stream of air preheated to 800° F. and is then ready for reuse.

It will be understood that the above description is merely illustrative of preferred embodiments of the invention, of which many variations may be made within the scope of the following claims by those skilled in the art without departing from the spirit thereof.

What is claimed is:

1. A continuous process for alkylating branched chain hydrocarbons which comprises effecting reaction of an isoparaffin containing from 4 to 20 carbon atoms with an olefin containing from 2 to 12 carbon atoms at from about room temperature to about 600° F. and at a pressure in the range of atmospheric to about 5000 p.s.i.g. employing a reaction mixture wherein the molar ratio of said isoparaffin to said olefin is below 3/1 in contact with a catalyst comprising a crystalline aluminosilicate having selective activity for effecting alkylation with said olefin; continuously removing the resultant alkylation product; said crystalline aluminosilicate having uniform pore openings of at least 7 angstrom units and an activity constant ($\alpha$) of at least 5, for a period of time until said catalyst exhibits decreased activity attributable to the accumulation in the pores thereof of polymerization products of said olefin, removing said accumulation by solvent extraction to effect regeneration of said catalyst and reusing the resulting regenerated catalyst in said process.

2. The process of claim 1 wherein the branched chain paraffin contains from 4 to 6 carbon atoms and the olefin contains from 2 to 6 carbon atoms.

3. The process of claim 1 wherein said aluminosilicate catalyst consists essentially of a rare earth-containing faujasite.

4. The process of claim 1 wherein the temperature is between about 50° F. and 300° F.

5. The process of claim 1 wherein the aluminosilicate catalyst contains cations selected from the group consisting of polyvalent metals having a valence of at least two, hydrogen ammonium and compounds thereof.

6. The process of claim 1 in which said aluminosilicate catalyst is selected from the group consisting of rare earth exchanged zeolite X and rare earth exchanged zeolite Y.

7. The process of claim 1 in which the aluminosilicate is contained in and distributed throughout a matrix.

8. The process of claim 1 in which the reaction is conducted under sufficient pressure to maintain at least one of the reactants in a liquid phase.

9. The process of claim 1 in which the solvent extraction is carried out at a temperature in the range of room temperature to 300° F. for a period of time in the range of one to 30 minutes.

10. The process of claim 9 in which the solvent is dioxane.

References Cited

UNITED STATES PATENTS

| | | | |
|---|---|---|---|
| 3,236,761 | 2/1966 | Rabo et al. | 252—455 Z |
| 3,251,902 | 5/1966 | Garwood et al. | 260—683.43 |
| 3,393,147 | 7/1968 | Dwyer et al. | 252—455 Z |
| 3,450,644 | 6/1969 | Lanewala et al. | 252—455 Z |

DELBERT E. GANTZ, Primary Examiner

G. J. CRASANAKIS, Assistant Examiner

U.S. Cl. X.R.

252—414